US008085875B2

(12) United States Patent
Gore et al.

(10) Patent No.: US 8,085,875 B2
(45) Date of Patent: Dec. 27, 2011

(54) INCREMENTAL PILOT INSERTION FOR CHANNNEL AND INTERFERENCE ESTIMATION

(75) Inventors: Dhananjay Ashok Gore, San Diego, CA (US); Avneesh Agrawal, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 11/128,976

(22) Filed: May 13, 2005

(65) Prior Publication Data

US 2006/0013338 A1    Jan. 19, 2006

Related U.S. Application Data

(60) Provisional application No. 60/588,686, filed on Jul. 16, 2004, provisional application No. 60/638,536, filed on Dec. 22, 2004.

(51) Int. Cl.
*H04L 27/00* (2006.01)

(52) U.S. Cl. ........ 375/324; 370/264; 370/537; 375/260; 375/E7.141; 700/99

(58) Field of Classification Search .................. 370/210; 455/436; 375/260, 324, 146; 710/117
See application file for complete search history.

(56) References Cited

U.S. PATENT DOCUMENTS

| | | | |
|---|---|---|---|
| 5,956,368 A * | 9/1999 | Jamal et al. ................... | 375/146 |
| 6,226,278 B1 | 5/2001 | Bursztejn et al. | |
| 6,473,467 B1 | 10/2002 | Wallace et al. | |
| 7,283,498 B2 | 10/2007 | Ro et al. | |
| 7,418,039 B2 | 8/2008 | Simmonds | |
| 2002/0119785 A1 | 8/2002 | Agin | |
| 2002/0152342 A1 * | 10/2002 | Das et al. ..................... | 710/117 |
| 2003/0078046 A1 * | 4/2003 | Seo .............................. | 455/436 |
| 2003/0174643 A1 * | 9/2003 | Ro et al. ...................... | 370/210 |

(Continued)

FOREIGN PATENT DOCUMENTS

JP    2002520432    7/2002

(Continued)

OTHER PUBLICATIONS

Ghogho (Optimized null-subcarrier selection for CFO estimation in OFDM over frequency-selective fading channels; Global Telecommunications Conference, 2001. GLOBECOM '01. IEEE; vol. 1, Nov. 25-29, 2001 pp. 202-206 vol. 1).*

(Continued)

*Primary Examiner* — David C. Payne
*Assistant Examiner* — Adolf Dsouza
(74) *Attorney, Agent, or Firm* — Donald C. Kordich

(57) ABSTRACT

Dynamic resource allocation systems, apparatus, and methods are disclosed for selectively improving the ability of a receiver to determine a channel estimate in an Orthogonal Frequency Division Multiple Access (OFDMA) system. A wireless communication system can use a common pilot channel configuration to aid channel estimation in one or more receivers in communication with the system. A receiver in communication with the system may be unable to demodulate received data due to an inaccurate channel estimate. The receiver can communicate to a transmitter in the system a request for additional channel estimation resources. The wireless communication system can provide additional channel estimation resources by inserting dedicated pilot channels into one or more of the frequencies allocated to symbols for the receiver. If the receiver is still unable to demodulate received data, the wireless communication system can incrementally insert additional pilot channels in the symbol associated with the receiver.

46 Claims, 6 Drawing Sheets

U.S. PATENT DOCUMENTS

| | | | |
|---|---|---|---|
| 2003/0215021 A1* | 11/2003 | Simmonds | 375/260 |
| 2004/0053597 A1 | 3/2004 | Agin | |
| 2004/0120411 A1 | 6/2004 | Walton | |
| 2004/0156386 A1* | 8/2004 | Atarashi et al. | 370/441 |

FOREIGN PATENT DOCUMENTS

| | | |
|---|---|---|
| JP | 2005519567 | 6/2005 |
| KR | 20030075117 A | 9/2003 |
| RU | 2192094 | 10/2002 |
| WO | WO0002939 A1 | 1/2000 |
| WO | WO03077492 A1 | 9/2003 |
| WO | WO03079593 A1 | 9/2003 |

OTHER PUBLICATIONS

Written Opinion, PCT/US2005/025157, International Searching Authority, European Patent Office, Nov. 7, 2005.

International Preliminary Report on Patentability, PCT/US2005/025157, The International Bureau of WIPO, Geneva, Switzerland, Jan. 16, 2007.

International Search Report—PCT/US05/025157, International Search Authority—European Patent Office—Nov. 7, 2005.

* cited by examiner

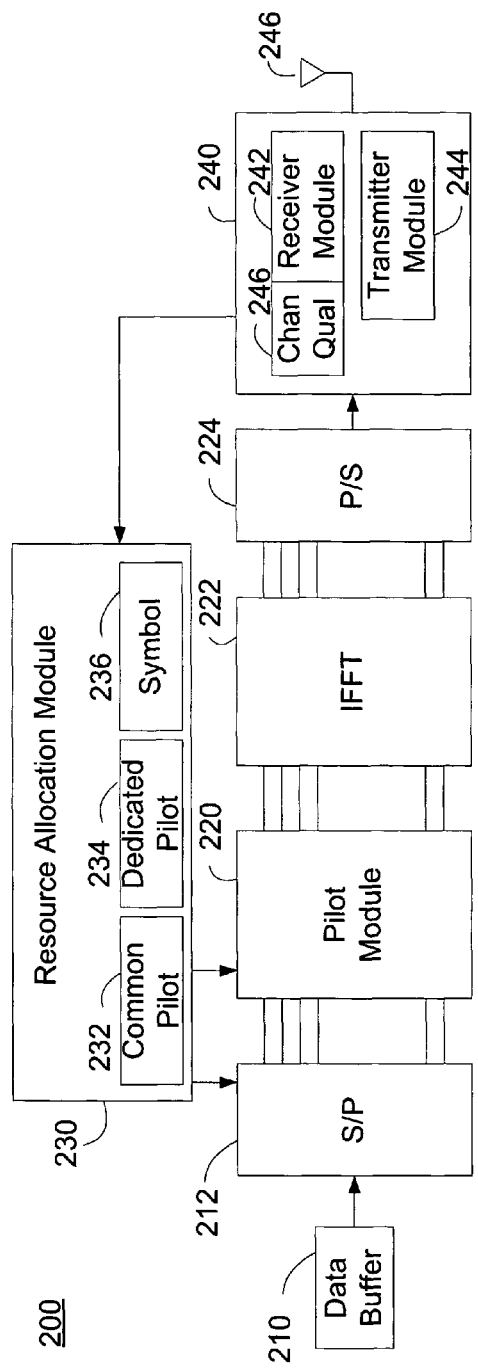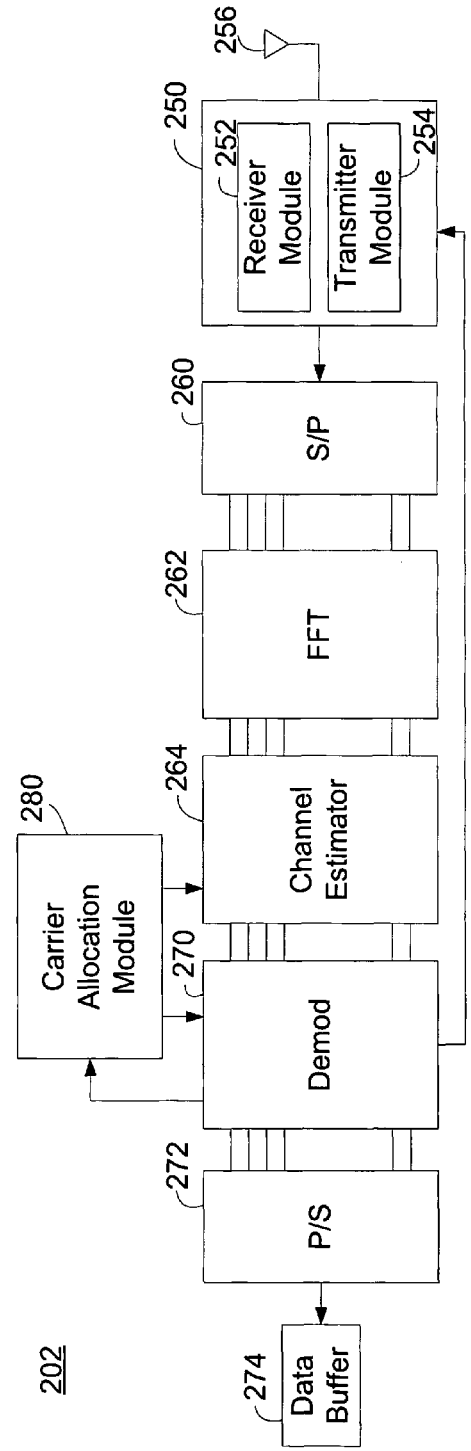
FIG. 2A
FIG. 2B

INCREMENTAL PILOT INSERTION FOR CHANNNEL AND INTERFERENCE ESTIMATION

This application claims priority to provisional U.S. application Ser. No. 60/588,686 entitled "Incremental Pilot Insertion For Channel/Interference Estimation," filed Jul. 16, 2004 and U.S. application Ser. No. 60/638,536 filed Dec. 22, 2004 which are incorporated herein by reference in their entirety.

BACKGROUND OF THE DISCLOSURE

1. Field of the Disclosure

The disclosure relates generally to the field of wireless communications. More particularly, the disclosure relates to allocation of resources for channel estimation.

2. Description of Related Art

In a wireless communication system, such as one implementing Orthogonal Frequency Division Multiple Access (OFDMA), the receiver can be configured to perform channel estimation as part of the demodulation process. The receiver may perform channel estimation in an OFDMA system to compensate for time varying frequency selective fading.

A receiver in an OFDMA system may perform channel estimation in a blind manner, without any knowledge of transmitted data, or may perform channel estimation based in part on one or more pilot channels that are broadcast and known to the receiver. In the configuration using pilot channels to aid receiver channel estimation, there is a trade off between the resources allocated to channel estimation and the system performance.

A communication system allocates a minimal number of pilot signals for channel estimation in order to maximize the available signal bandwidth. However, an inadequate allocation of resources to channel estimation may result in an inadequate channel estimate, which may result in the inability to demodulate received data and degradation of system performance.

Conversely, an allocation of excessive resources to channel estimation can ensure each receiver is able to determine an adequate channel estimate, but may burden the system and reduce its capacity. In this configuration, the system ensures the most degraded receiver is able to determine an accurate channel estimate at the cost of capacity of other better situated receivers.

It is desirable to allocate resources in a wireless communication system to allow for accurate channel estimation in receivers, but to minimize the allocation of resources such that channel capacity is not unnecessarily degraded.

BRIEF SUMMARY OF THE DISCLOSURE

Dynamic resource allocation systems, apparatus, and methods are disclosed for selectively improving the ability of a receiver to determine a channel estimate in an Orthogonal Frequency Division Multiple Access (OFDMA) system. A wireless communication system can use a common pilot channel configuration to aid channel estimation in one or more receivers in communication with the system. A receiver in communication with the system may be unable to demodulate received data due to an inaccurate channel estimate. The receiver can communicate to a transmitter in the system a request for additional channel estimation resources. The wireless communication system can provide additional channel estimation resources by inserting dedicated pilot channels into one or more of the frequencies allocated to symbols for the receiver. If the receiver is still unable to demodulate received data, the wireless communication system can incrementally insert additional pilot channels in the symbol associated with the receiver.

The disclosure includes an apparatus for dynamic allocation of resources for channel estimation. The apparatus includes a channel quality module configured to determine a request for channel estimation resources, and a resource allocation module coupled to the receiver and configured to determine a baseline resource level and a variable resource level, the variable resource level based at least in part on the request for channel estimation resources. The embodiment can also include a transmitter configured to transmit a signal having a portion allocated to channel estimation based on the baseline resource level and the variable resource level.

The disclosure also includes an apparatus for dynamic allocation of resources for channel estimation, including a common pilot module configured to determine a first subset of carriers from a set of Orthogonal Frequency Division Multiple Access (OFDMA) carriers, the first subset of carriers allocated to a common pilot signal, a symbol module configured to determine a second subset of OFDMA carriers allocated to a communication link, the second subset of OFDMA carriers distinct from the first subset of OFDMA carriers, a dedicated pilot module configured to allocate at least one carrier from the second subset of OFDMA carriers to channel estimation, a symbol generator configured to generate an OFDMA symbol from the OFDMA carriers, and a transmitter configured to transmit the OFDMA symbol having the dedicated pilot signals allocated to channel estimation The disclosure also includes an apparatus for channel estimation based on dynamic allocation of resources, including a receiver configured to receive an Orthogonal Frequency Division Multiple Access (OFDMA) symbol having resources allocated to channel estimation, a transform module coupled to the receiver and configured to transform the OFDMA symbol to a plurality of carriers, a carrier allocation module configured to determine a first subset of carriers corresponding to a common pilot signal, a second subset of carriers corresponding to data carriers, and at least one carrier from the second subset of carriers corresponding to a dedicated pilot signal, a channel estimator coupled to the transform module and the carrier allocation module, and configured to determine a channel estimate based in part on the common pilot signal and the dedicated pilot signal, and a demodulator configured to demodulate the data carriers based in part on the channel estimate.

The disclosure also includes a method of generating a signal having dynamically allocated channel estimation resources, including assigning a baseline level of resources to channel estimation, determining a request for additional resources, allocating additional resources to channel estimation, and generating a signal based in part on the baseline level of resources and the additional resources.

The disclosure also includes a method of receiving a signal having dynamically allocated channel estimation resources, including receiving an Orthogonal Frequency Division Multiple Access (OFDMA) symbol, determining a baseline level of channel estimation resources included in the OFDMA symbol, determining additional channel estimation resources included in the OFDMA symbol, determining a channel estimate based on the baseline level and additional channel estimation resources, and demodulating the received symbol based in part on the channel estimate.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 2A-2B illustrate functional block diagrams of embodiments of a generator and a receiver configured for dynamic pilot insertion for channel estimation.

DETAILED DESCRIPTION OF THE DISCLOSURE

Figure 1:
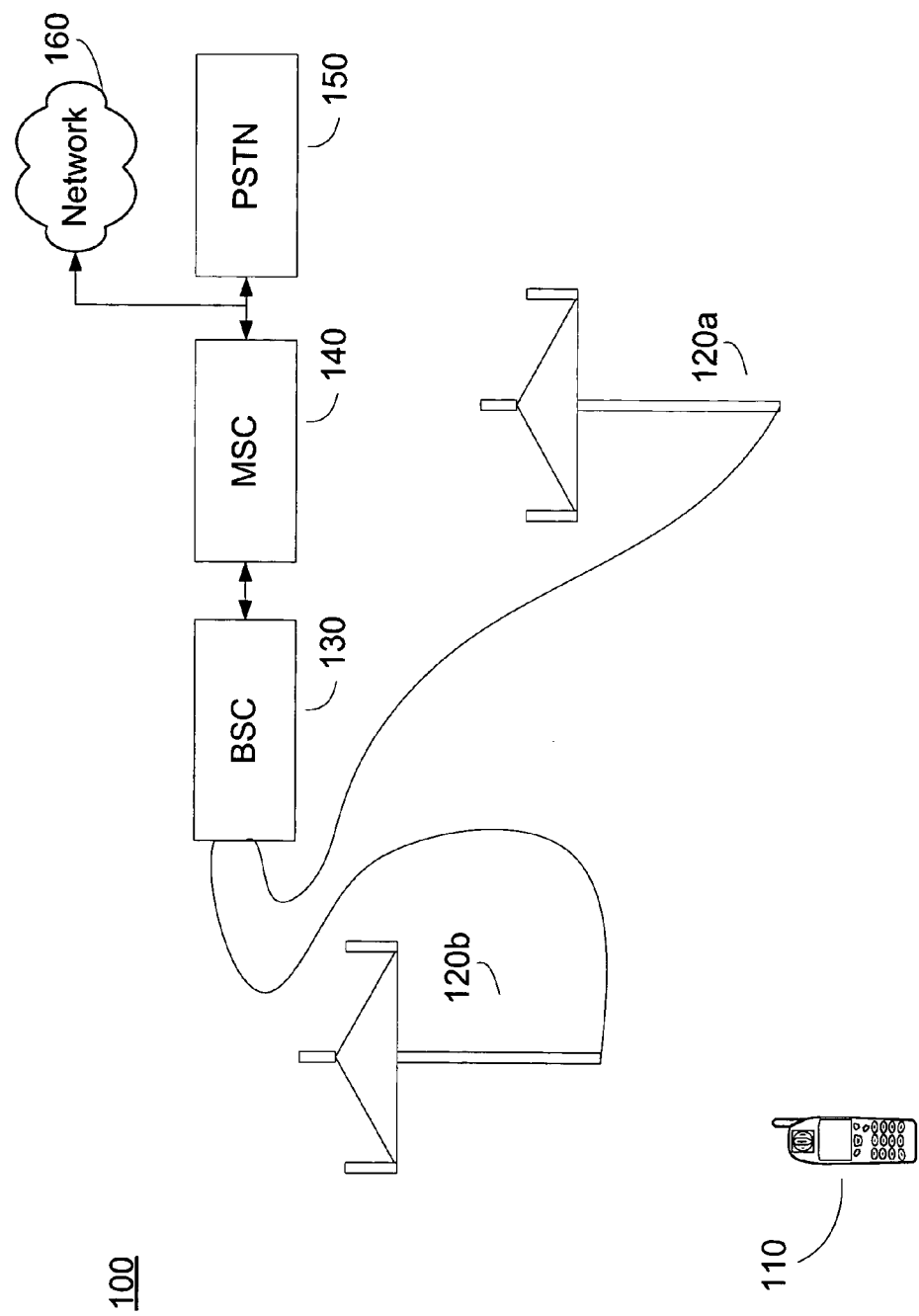
FIG. 1 illustrates a functional block diagram of an embodiment of a wireless communication system implementing dynamic pilot insertion for channel estimation.

A wireless communication system, such as an OFDMA communication system, can allocate a baseline level of resources for receiver channel and interference estimation. The baseline level of resources can be determined based on a nominal operating parameters for receivers and a corresponding probability of successful data demodulation, given the baseline level of resources and receiver operating parameters.

However, because of the variable nature of operating conditions and channel characteristics experienced by a portable user terminal in a wireless communication system, there exist conditions where the baseline level of resources will be insufficient for the receiver to accurately estimate channel and interference. The inaccurate channel and interference estimate can result in the inability of the receiver to demodulate data using the estimate. The receiver can indicate or otherwise inform the transmitter of the unsuccessful data demodulation. For example, the receiver can be configured to send a retransmit request, or can be configured to omit sending an acknowledgement message in response to unsuccessful data demodulation.

The wireless communication system may then allocate additional resources to channel and interference estimation. In one embodiment, the wireless communication system can allocate additional resources that increase the ability of a plurality of receivers to estimate the channel and interference. In another embodiment, the wireless communication system can allocate additional resources for channel and interference estimation dedicated to the particular receiver reporting the inability to demodulate data. The wireless communication system can continue to dynamically allocate channel and interference estimation resources for each of the receivers.

An example of an OFDMA wireless communication system configured for dynamic resource allocation includes a transmitter configured to provide one or more pilot signals for channel estimation. The baseline level of resources can correspond to a common pilot configuration, that can be, for example, arranged substantially in a comb configuration. Furthermore, the comb configuration of the common pilot may occur in different frequencies for different times, and the pattern occupied by the pilot signals may be predetermined. In one example, the pilot signals may be configured to operate as a staggered comb, with the pilot signals alternating between two sets of frequencies. The wireless communication system can transmit the pilot signals during the time that data symbols are transmitted to receivers, or can be configured to transmit the pilot signals during predetermined times for exchange of control information. In another embodiment, the baseline level of resources can correspond to one or more dedicated pilot signals or a combination of common pilot signals in combination with one or more dedicated pilot signals.

Each active receiver in the OFDMA wireless communication system can be assigned a subset of the OFDM frequencies. Each receiver can be configured to have knowledge of the common pilot configuration, and can be configured to determine an estimate of the channel and interference based on the received common pilot signals. The receiver can then demodulate received data based in part on the channel and interference estimate. The receiver can demodulate the received data, provided the channel and interference estimates are sufficient, the received data is not corrupted, and the received signal strength is sufficient.

In some instances, the receiver may not be able to determine a sufficiently accurate channel and interference estimate based on the common pilot signals. The inaccurate channel and interference estimate may result in the inability of the receiver to demodulate the received data. In such a situation, the receiver may not send an acknowledge message (ACK), may transmit a retransmission request, or may otherwise indicate the inability to decode the received data.

The transmitter in the wireless communication system may then retransmit the unsuccessfully received data. The wireless communication system may also be configured to increase the amount of resources available to the receiver for channel and interference estimation. For example, the wireless communication system can be configured to include additional pilot signals. In one embodiment, the wireless communication system includes additional dedicated pilot signals. The dedicated pilot signals can be inserted within an OFDMA symbol in place of one or more of the frequencies that would normally be data modulated. Thus, the dedicated pilot signal effectively is code punctured onto the data symbol. The dedicated pilot signal does not affect the channel bandwidth of any other user because the dedicated pilot signal uses no resources from any other receiver. The receiver can use the dedicated pilot signal code punctured onto the transmitted data to further refine the channel and interference estimate. The receiver can determine the position and number of the dedicated pilot signals based on a predetermined algorithm. In another embodiment, the wireless communication system communicates the position and number of the dedicated pilot signals to the receiver on a control or overhead channel.

In one embodiment, the other receivers can continue to estimate channel and interference without any knowledge of the dedicated pilot signals. In another embodiment, one or more of the other receivers can use knowledge of the dedicated pilot to further increase the accuracy of the channel and interference estimate determined by those receivers. The wireless communication system thus dynamically varies the amount of resources allocated to channel and interference estimation.

FIG. 1 illustrates a functional block diagram of an embodiment of a wireless communication system 100 having dynamic pilot insertion for channel estimation. The system includes one or more fixed elements that can be in communication with a user terminal 110. The user terminal 110 can be, for example, a wireless telephone configured to operate according to one or more communication standards. The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 130 that routes the communication signals to and from the appropriate base stations 120a and 120b. The BSC 130 is coupled to a Mobile Switching Center (MSC) 140 that can be configured to operate as an interface between the user terminal 110 and a Public Switched Telephone Network (PSTN) 150. The MSC 140 can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 140 is coupled to the PSTN 150 and network 160. The MSC 140 can also be configured to coordinate inter-system handoffs with other communication systems (not shown).

The wireless communication system 100 can be configured as an OFDMA system with communications in both the forward link and reverse link utilizing OFDM communications. The term forward link refers to the communication link from the base stations 120a or 120b to the user terminal 110, and the term reverse link refers to the communication link from the user terminal 110 to the base stations 120a or 120b. Both the base stations 120a and 120b and the user terminal 110 may allocate resources for channel and interference estimation. For example, both the base stations 120a and 120b and the user terminal 110 may broadcast pilot signals that are used be the corresponding receivers for channel and interference estimation. For the sake of clarity, the description of the system embodiment discusses allocation of resources for channel and interference estimation in the forward link. However, it is understood that such resource allocation is not limited to application in the forward link, but may be used in both the forward link as well as the reverse link, or may be implemented in one communication link exclusive of the other.

The base stations 120a and 120b can be configured to broadcast a common pilot signal as a baseline level of resources allocated to channel and interference estimation. The common pilot signal can include a number of tones selected from the OFDM frequency set. For example, the common pilot signal can be formed from uniformly spaced tones selected from the OFDM frequency set. The uniformly spaced configuration may be referred to as a comb pilot signal. As noted earlier, in other embodiments, the baseline level of resources can be dedicated pilot signals or a combination of common pilot signals with dedicated pilot signals.

The common pilot signal can include two or more sets of tones selected from the OFDM frequency set and can transmit one of the sets of tones based on a predetermined sequence or algorithm. In one embodiment, the common pilot signal can be one of two tone sets, and the base station, for example 120a, can alternate between the two tone sets.

The common pilot signal and modulated data experience distortion and degradation attributable, in part, to the channel. The user terminal 110 can receive the common pilot signal along with modulated data from a base station, for example 120a. The time domain signal received by the user terminal can be modeled as $y(t)=s(t)*h(t)+i(t)+n(t)$, where $s(t)$, $h(t)$, $i(t)$ and $n(t)$ represent, respectively, the modulated data, the channel, the interference, and additive noise. The symbol "*" refers to the convolution operator.

The user terminal 110 can determine a channel and interference estimate based on the common pilot signals, and may determine the estimate in the frequency domain, although a time domain estimate may be determined instead of, or in addition to, the frequency domain estimate. The user terminal 110 can then demodulate the received signal to recover the data.

The user terminal 110 may be unable to successfully demodulate received signals because the channel quality is inadequate and cannot support the transmitted rate of the data. Alternatively, the user terminal 110 may be unable to successfully demodulate the received signals even though the channel can support the transmitted data rate because degradation attributable to inadequate channel and interference estimation is sufficiently severe to result in decoding error.

In the former case, allocating additional resources to channel and interference estimation does not remedy the inadequate channel quality. In such a situation, the transmitter may need to reduce the transmitted data rate. However, allocating additional resources to channel and interference estimation to the latter condition can allow the user terminal 110 to be able to demodulate the data at the transmitted data rate.

The user terminal 110 can be configured to provide an indication to the wireless communication station 100, for example via the base station 120a, of the inability to demodulate the data. The indication can be in the form of a message, or lack thereof, transmitted from the user terminal 110 to the base station 120a. The user terminal 110 can transmit the indication, for example, over a control channel or a feedback channel.

In one embodiment, the indication can be a request for retransmission. In another embodiment, the indication can be the lack of an acknowledgement message (ACK).

If the wireless communication system 100 determines the inability of the user terminal 110 to demodulate data, such as through the receipt of an indication by the base station 120a, the wireless communication system 100 can allocate additional resources to channel and interference estimation. In one embodiment, the base station 120a includes additional tones in the common pilot signals. In another embodiment, the base station can include dedicated pilot signals that code puncture the data transmitted to the user terminal 110 that indicated the inability to demodulate data. The base station 120a may also be configured to decrease the data rate of the data transmitted to the user terminal 110.

The dedicated pilot signals are selected from the frequencies used to generate the OFDMA symbol transmitted to the user terminal 110. Because the pilot carrier is selected from one of the data carriers, the dedicated pilot has the benefit of experiencing the same channel and interference fluctuations experienced by the data. However, because the carrier for the dedicated pilot is selected from one of the data carriers, the allocation of one or more dedicated pilot can result in some loss in data throughput.

Inserting dedicated pilot signals into the transmitted data carriers allows the pilot signals to experience the same channel and interference conditions experienced by the data symbols. A dedicated pilot can be particularly advantageous in assisting the user terminal 110 in determining the channel and interference estimates in a power controlled configuration where the carrier power on data carriers is much higher than the power on the common pilot tones. The dedicated pilot signals are also particularly advantageous for user terminal 110 channel and interference estimation when interference or channel fluctuations experienced by the data carriers is different from that experienced by the tones used for the common pilot signals.

In one embodiment, the dedicated pilot signal can be an unmodulated tone selected from the frequencies used to generate an OFDMA symbol transmitted to the user terminal 110. In another embodiment, the dedicated pilot signal can be null pilots in which no signal is transmitted on a tone frequency selected from the frequencies used to generate an OFDMA symbol transmitted to the user terminal 110.

The performance reduction attributable to allocation of resources to one or more dedicated pilot signals can be mitigated to some extent through the use of a Hybrid Automatic Retransmission Request (HARQ) configuration where successive transmissions of data are carried out with corresponding lower rates if the prior transmission is not successfully decoded at the receiver.

Because the dedicated pilot signals are inserted in the position of data carriers, the allocation of dedicated pilot signals can be viewed as code puncturing. The initial data transmission may be particularly sensitive to code puncturing because it can occur at the highest code rate used by the system. In the embodiment where the wireless communication system 100 is configured for incremental dedicated pilot insertion, the additional channel and interference estimation resources are added in retransmissions. If the inability to decode the previous transmission is due to insufficient channel and interference estimation, the additional resources will assist the receiver in decoding the retransmitted data. Additionally, if the retransmitted data is transmitted at a lower rate relative to the previous transmission of the data, the puncturing loss can be small. The performance penalty attributable to the insertion of dedicated pilot signals in later transmissions is less than the performance penalty of including the dedicated pilot signals in the original transmission. Therefore, correspondingly more estimation resources can be added to subsequent transmissions without incurring a significant performance penalty.

Although the above description of the system 100 of FIG. 1 generally describes a wireless telephone system, the system 100 is not limited to implementation as a wireless telephone system nor is the system 100 limited to having the particular elements shown in FIG. 1. For example, in another embodiment, each of the base stations 120*a* and 120*b* may be referred to as a Node B. In another embodiment, the system 100 can implement a Packet Data Serving Node (PDSN) in place or in addition to the PSTN 150. The PDSN can operate to interface a packet switched network with the wireless portion of the system 100.

Other embodiments of the system 100 may include access points, node Bs, or other structures in place of the base stations 120*a* and 120*b*. In such a system 100 embodiment, the BSC 130 and MSC 140 may be omitted and may be replaced with one or more switches, hubs, or routers.

FIG. 2A illustrates a functional block diagram of an embodiment of a generator 200 configured for dynamic resource allocation for channel and interference estimation. The embodiment of the generator 200 can be implemented, for example, in one or both of the base station 120*a* or 120*b* and user terminal 110 shown in the wireless communication system 100 of FIG. 1.

The following discussion describes an embodiment in which the generator 200 is implemented in a base station of a wireless communication system configured for OFDMA communications. The generator 200 is configured to transmit one or more OFDMA signals to one or more user terminals. The generator 200 includes a data buffer 210 configured to store data destined for one or more receivers. The data can be, for example, raw unencoded data or encoded data. Typically, the data stored in the data buffer 210 is encoded, and may include encoding for error detection and Forward Error Correction (FEC). The encoded data can be encoded according to one or more encoding algorithms. The encoding can include, but is not limited to, convolutional coding, block coding, interleaving, direct sequence spreading, cyclic redundancy coding, and the like, or some other coding.

The data to be transmitted is coupled to a serial to parallel converter 212 that is configured to convert a serial data stream stored in the data buffer 210 to a plurality of data streams in parallel. The number of carriers allocated to any particular user terminal may be a subset of all available carriers. Therefore, the data destined for a particular user terminals is converted to those parallel data streams corresponding to the data carriers allocated to that user terminal.

The output of the serial to parallel converter 212 is coupled to a pilot module 220 that is configured to allocate the common pilot channels to the common pilot and to determine which of the user terminals will be allocated one or more dedicated pilot channels. The pilot module 220 can be configured to modulate each of the carriers of the OFDMA system with a corresponding data or pilot signal.

The output of the pilot module 220 is coupled to an Inverse Fast Fourier Transform (IFFT) module 222. The IFFT module 222 is configured to transform the OFDMA carriers to corresponding time domain symbols. Of course, a Fast Fourier Transform (FFT) implementation is not a requirement, and a Discrete Fourier Transform (DFT) or some other type of transform can be used to generate the time domain symbols. The output of the IFFT module 222 is coupled to a parallel to serial converter 224 that is configured to convert the parallel time domain symbols to a serial stream.

The serial OFDMA symbol stream is coupled from the parallel to serial converter 224 to a transceiver 240. In this embodiment, the transceiver 240 is a base station transceiver configured to transmit the forward link signals and receive reverse link signals.

The transceiver 240 includes a transmitter module 244 that is configured to convert the serial symbol stream to an analog signal at an appropriate frequency for broadcast to user terminals via an antenna 246. The transceiver 240 can also include a receiver module 242 that is coupled to the antenna 246 and is configured to receive the signals transmitted by one or more remote user terminals. The receiver module 242 can include a channel quality module 246 that is configured to receive an indication of the estimated channel quality determined by one or more receivers.

A resource allocation module 230 is configured to determine which of the data carriers are assigned to each of the user terminals and which of the carriers are to be allocated to common and dedicated pilot signals. The resource allocation module 230 can include a common pilot module 232 configured to determine the carriers allocated to the common pilot signal, a symbol module 236 configured to determine the carriers allocated to the data symbols for each user terminal, and a dedicated pilot module 234 configured to determine which, if any, of the carriers identified by the symbol module 236 are to be configured as dedicated pilot signals. For example, the resource allocation module 230 can determine the subset of carriers to allocate as data carriers for a particular user terminal based in part on a predetermined frequency hopping algorithm. In another embodiment, the resource allocation module 230 can determine the subset of carriers to allocate as data carriers for a particular user terminal based on availability of a contiguous block of carriers. The resource allocation module 230 can then control the manner in which data from the data buffer 210 is read into the serial to parallel converter 212 to ensure the frequency allocation is maintained.

Similarly, the resource allocation module 230 can determine which of the carriers are allocated to a common pilot signal based on a predetermined common pilot algorithm. For example, the resource allocation module 230 can be configured to allocate resources to generate a staggered comb as the common pilot signal. The common pilot signal is typically used by the user terminals to generate a channel and interference estimate used in demodulating the received symbols.

The resource allocation module 230 is also configured to allocate carriers for the dedicated pilot signals. Initially, the data transmitted to each user terminal may not include any dedicated pilot signals. However, one or more of the user terminals may be unable to decode the received signal. The user terminal can indicate the unsuccessful demodulation to the generator 200. For example, the user terminal can broadcast a retransmission request or a receipt unsuccessful indication to the receiver module 242 in the transceiver 240. Alternatively, the generator 200 can be configured to determine the user terminal did not successfully demodulate data if an ACK is not received within a predetermined time period. The channel quality module 246 coupled to the receiver module 242 can determine from the received signal, whether from a channel quality signal, retransmission request, or omitted ACK message, a request for channel estimation resources.

The resource allocation module 230 can be coupled to the channel quality module and is configured to receive, for example, the indication of unsuccessful demodulation and the identity of the corresponding user terminal. The resource allocation module 230 can then be configured to allocate additional channel and interference estimation resources to the user terminal in the form of dedicated pilot signals.

In another embodiment, the resource allocation module 230 can be configured to modify the level of resources allocated to the common pilot or the dedicated pilot in response to some other event or control. The resource allocation module 230 is not limited to modifying the resources allocated to common pilot and dedicated pilot based on feedback from one or more user terminals.

In one embodiment, the receipt of an unsuccessful demodulation indication results in retransmission of data. The retransmitted data is re-encoded at a lower data rate before being stored in the data buffer 210. However, the use of a reduced data rate for retransmission is not required.

In another embodiment, the receipt of an unsuccessful demodulation indication results in additional channel and interference estimation resources, but does not result in retransmission. Such an embodiment may be advantageous in time sensitive implementations where there is insufficient time to retransmit the unsuccessfully demodulated data.

In one embodiment of incremental resource allocation, the resource allocation module 230 allocates one of the data carriers for the user terminal to a dedicated pilot. The resource allocation module 230 can control the data buffer 210 such that no data is provided to the serial to parallel converter 212 at the time corresponding to the data carrier allocated to the dedicated pilot. The carrier assigned to the dedicated pilot signal may be modulated with one or more predetermined symbols allocated to a dedicated pilot. Alternatively, the carrier assigned to the dedicated pilot signal may remain unmodulated. The resource allocation module 230 may also control the pilot module 220 to blank, null, or otherwise substantially reduce the power of the carrier allocated to the dedicated pilot signal. The null pilot can be advantageous where significant symbol power is normally allocated to each data carrier.

In another embodiment, the resource allocation module 230 continues to allocate data from the data buffer 210 to the serial to parallel converter 212 according to the carrier allocation. However, the resource allocation module 230 controls the pilot module 220 to override the data corresponding to the carrier allocated to the dedicated pilot signal. The data corresponding to the carrier allocated to the dedicated pilot can be dropped, or the carrier corresponding to the dedicated pilot can be nulled.

The resource allocation module 230 can continue to allocate a dedicated pilot to a particular user terminal until a successful demodulation indication is received. If another unsuccessful demodulation indication is received for the same user terminal for which a dedicated pilot is allocated, the resource allocation module 230 can allocate one or more additional dedicated pilot signals for the user terminal. The resource allocation module 230 can thus dynamically allocate and de-allocate resources for channel and interference estimation based on the needs of the particular user terminal.

FIG. 2B illustrates a functional block diagram of an embodiment of a receiver 202 configured to operate in an OFDMA wireless communication system having dynamic channel and interference resource allocation. The receiver 202 can be, for example, part of a user terminal 110 or base station 120a or 120b shown in FIG. 1. The following discussion describes a receiver 202 implemented in a user terminal.

The receiver 202 can include an antenna 256 coupled to a transceiver 250 configured to communicate over a wireless channel with the generator 200. The transceiver 250 can include a receiver module 252 configured to receive the wireless signals, via the antenna 256, and generate a serial baseband symbol stream.

The output of the receiver module 250 of the transceiver 250 is coupled to a serial to parallel converter 260 configured to convert the serial symbol stream to a plurality of parallel streams corresponding to the number of carriers in the OFDMA system.

The output of the serial to parallel converter 260 is coupled to a Fast Fourier Transform (FFT) module 262. The FFT module 262 is configured to transform the time domain symbols to the frequency domain counterpart.

The output of the FFT module 262 is coupled to a channel estimator 264 that is configure to determine a channel and interference estimate based in part on the common pilot signals and any dedicated pilot signals. A carrier allocation module 280 determines the carriers assigned to the data, the carriers assigned to the common pilot signals, and the carriers, if any, assigned to the dedicated pilot signals. The carrier allocation module 280 is coupled to the channel estimator 264 and informs the channel estimator 264 of the carrier allocation.

The channel estimator 264 determines a channel and interference estimate based in part on the common pilot signals the dedicated pilot signals, if any. The channel estimator 264 can determine an estimate using a least squares method, a maximum likelihood estimate, a combination of least squares and maximum likelihood estimate, and the like, or some other process of channel and interference estimation.

The output of the channel estimator 264 including the frequency domain transform of the received symbols and the channel and interference estimate is coupled to a demodulator 270. The carrier allocation module 270 also informs the demodulator 270 of the carrier frequencies allocated to data transmission. The demodulator 270 is configured to demodulate the received data carriers based in part on the channel and interference estimate. In some instances, the demodulator 270 may be unable to demodulate the received signals. As noted earlier, the demodulator 270 may be unsuccessful because the channel quality is inadequate and cannot support the transmitted rate of the data, or because degradation attributable to inadequate channel and interference estimation is sufficiently severe to result in decoding error.

If the demodulator 270 is unsuccessful, it can generate an indication of the inability to demodulate the received signals. The demodulator 270 can, for example, inform the carrier allocation module 280 such that the carrier allocation module 280 can expect a dedicated pilot signal in subsequent transmission. The demodulator 270 can also provide an unsuccessful demodulation indication to the transmitter module 254 in the transceiver 250 for transmission back to the generator 200.

If the demodulator 270 is unsuccessful, the received data is dropped, and there is no need to couple any data to memory. If the demodulator 270 is successful, the demodulator 270 can be configured to couple the demodulated data to a parallel to serial converter 272 that is configured to convert the parallel demodulated data to a serial data stream. The output of the parallel to serial converter 272 is coupled to a data buffer 274 for further processing.

Figure 3:
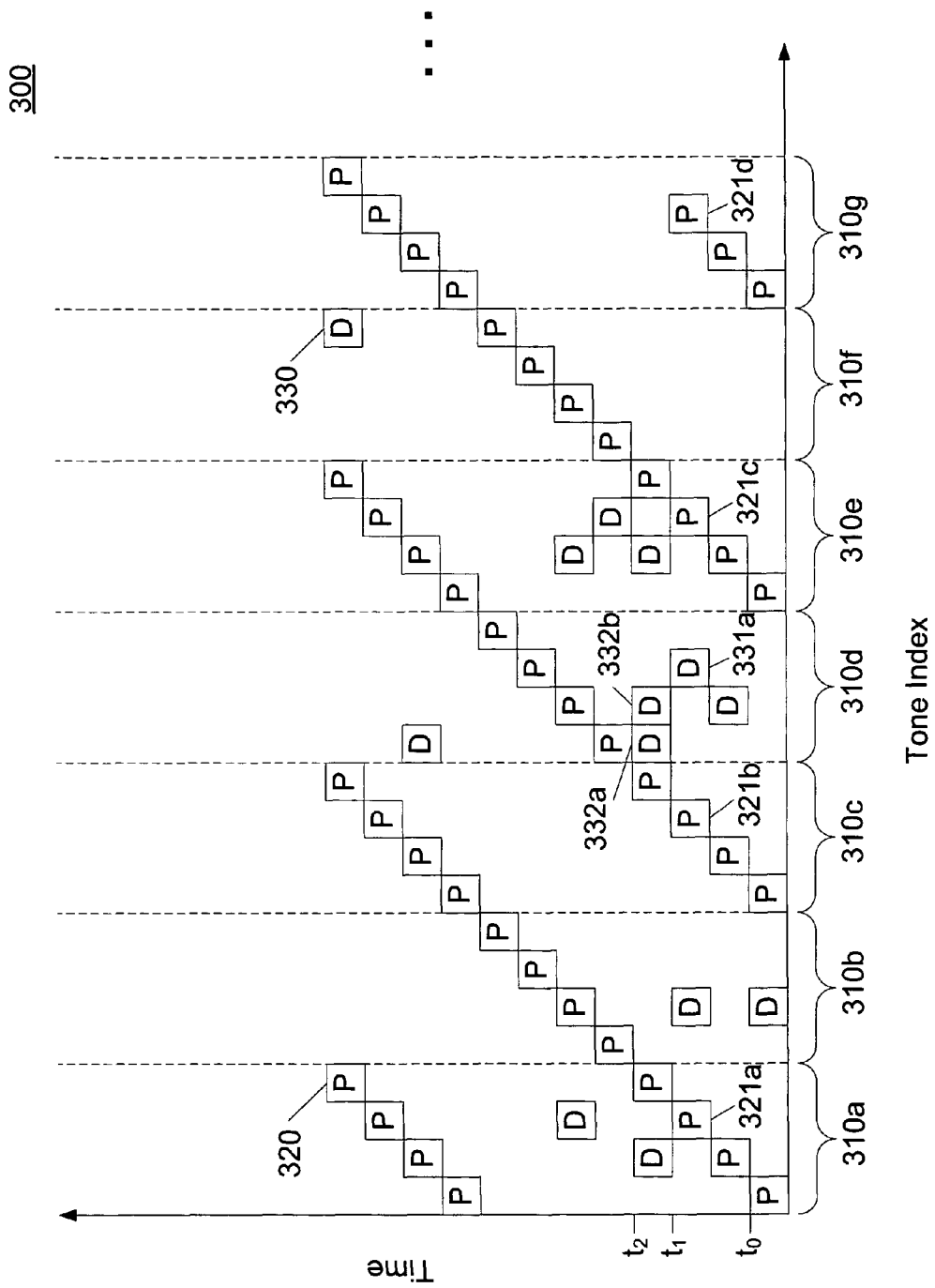
FIG. 3 illustrates a diagram of an example of the spectrum of an OFDMA system for various common and dedicated pilot channel configurations.

FIG. 3 illustrates a time-frequency diagram 300 of an example of a spectrum of an OFDMA communication system having incremental resource allocation in the form of incremental dedicated pilot insertion. The time-frequency diagram 300 illustrates an example of an OFDMA system in which carrier blocks 310a-310f are assigned to each user in the system. A number of common pilot signals, designated by 'P' e.g. 320, are present in each time epoch, but do not necessarily appear within each carrier block 310a-310f. Additionally, the common pilot signals, e.g. 320, are not assigned to the same carriers at each time epoch, but instead follow a predetermined algorithm. Each receiver determines a channel and interference estimate based in part on all of the common pilot signals. However, typically, only the receiver having the dedicated pilot signal in its carrier block uses the dedicated pilot in addition to the common pilot signals in determining a channel and interference estimate. In some embodiments, other receivers can be configured to receive the dedicated pilot signals outside of a carrier block and use them to determine a channel and interference estimate.

For example, at time $t_0$ a first carrier block 310a includes one common pilot signal but no dedicated pilot signals. However, a receiver assigned to the first carrier block 310a uses all of the common pilot signals in determining a channel and interference estimate. Similarly, another receiver assigned to carrier block 310d at time $t_0$ does not include any common pilot signals in its carrier block 310d, but estimates channel and interference using all common pilot signals.

According to the example, at a time $t_1$ a receiver assigned to the carrier block 310d includes a dedicated pilot signal 331a. Thus, at time $t_1$ the receiver assigned to the carrier block 310d determines a channel estimate based on the dedicated pilot signal 331a in addition to all common pilot signals, which include 321a-321d. Advantageously, the dedicated pilot signal, 331a, is always within the block of carriers assigned to the receiver. Thus, the channel and interference estimate derived using the designated pilot will likely be more accurate than an estimate derived from pilot signals outside the assigned carrier block.

From the diagram, at time $t_2$ the receiver assigned to the carrier block 310d includes two dedicated pilot signals 332a-332b. This situation may occur, for example, where the receiver is unable to demodulate the signals provided at time $t_1$ and indicates to the generator unsuccessful demodulation. The generator then allocated additional dedicated pilot signals to the receiver. From the diagram, it can be seen that the number and location of dedicated pilot signals may vary at each time epoch. The dedicated pilot signals typically have no affect on the receivers not assigned to the carriers for the dedicated pilot.

In other embodiments, it may be advantageous to reduce the amount of resources allocated for channel and interference estimation. Such a situation may be advantageous where a receiver has sufficient ability to estimate the channel and interference from less than the base level of resources, or can use a previous channel and interference estimate. For example, at time $t_1$ the receiver assigned to the carrier block 310g would normally have a common pilot signal present within the carrier block. However, if the receiver indicates to the generator a sufficiently high signal quality, one or more pilot resources within the carrier block 310g can be omitted and data symbols transmitted instead. In such a situation, reduction in channel and interference estimation resources can improve the system performance.

The reduction in resources need not be a reduction in common pilot resources. For example, at time $t_1$ the receiver assigned to the carrier block 310b omits a dedicated pilot that appeared in the previous time epoch. Thus, the reduction in resources can include a combination of dedicated and common pilot resources. In one embodiment, a transmitter can determine that a receiver has a signal quality greater than a predetermined threshold. The receiver can, for example transmit a signal quality metric back to the transmitter. In such a situation, the transmitter can reduce the amount of resources allocated to the receiver.

Figure 4:
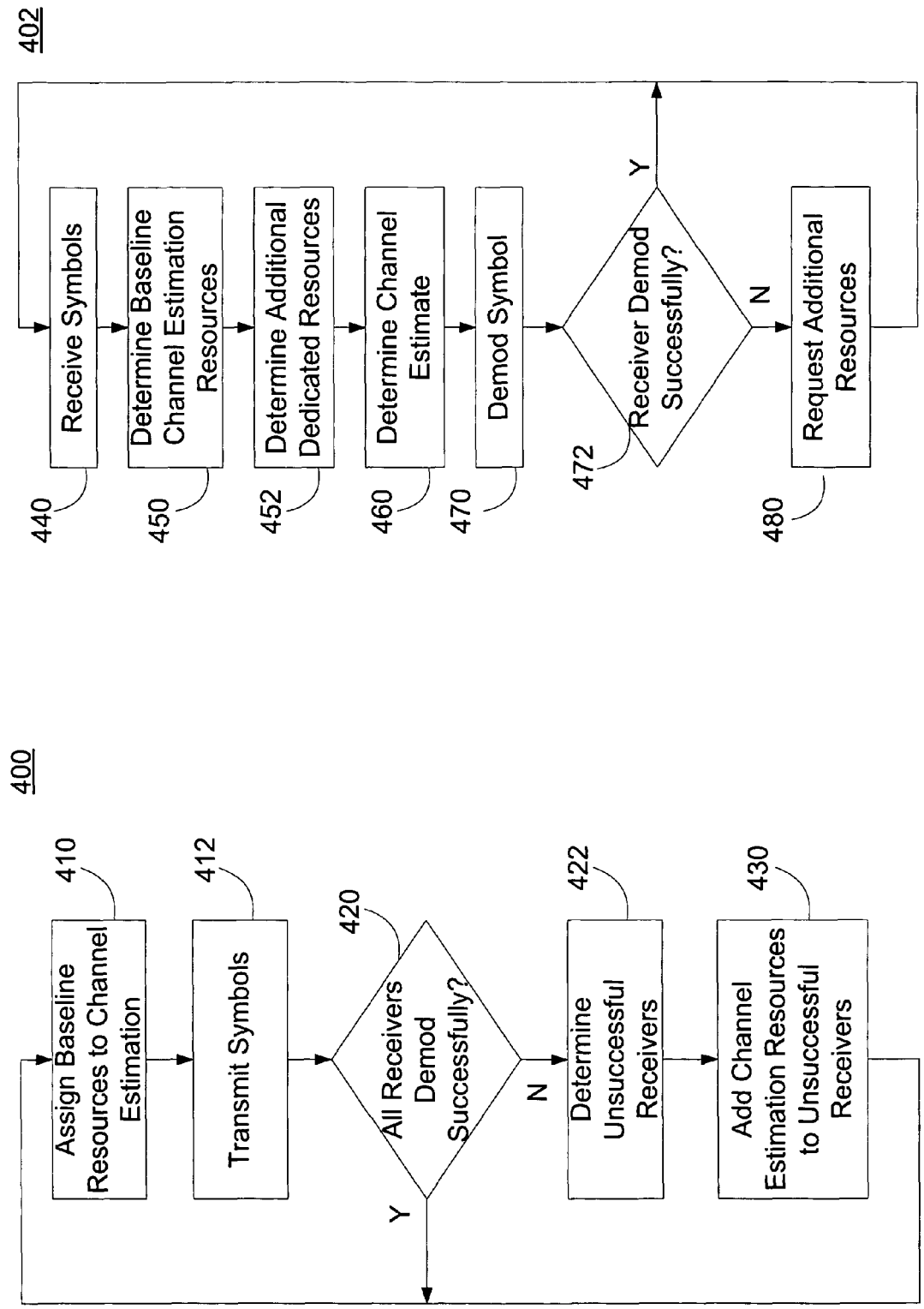
FIGS. 4A-4B illustrate flowcharts of embodiments of processes for dynamic allocation of channel estimation resources by pilot insertion.

FIG. 4A illustrates a flowchart of an embodiment of a method 400 of allocating resources for channel and interference estimation. The method 400 can be implemented, for example, in the forward link path of the base stations 120a-120b of FIG. 1. In other embodiments, the method can be implemented in the reverse link path of the user station 110 of FIG. 1.

For the sake of explanation, the method 400 is described as implemented within a forward link path of a base station. The method 400 begins at block 410 where the base station assigns baseline resources to channel estimation. The base station proceeds to block 412 and transmits symbols and the baseline channel and interference resources to one or more receivers.

The base station then proceeds to decision block 420 to determine if all of the receivers successfully received and demodulated the transmitted symbols. If so, the there is no reason to allocate additional resources to channel and interference estimation, and the base station returns to block 410.

However, if at least one receiver could not successfully demodulate the transmitted symbols, the base station proceeds to block 422 and determines which of the receivers were unsuccessful. Once the base station has determined the identity of the unsuccessful receiver, for example, using requests for retransmission or the absence of ACK messages, the base station proceeds to block 430 and adds channel estimation resources to the unsuccessful receivers. The additional resources can be in the form of additional common resources or dedicated resources. Additional common resources may be less desirable because they may unnecessarily degrade the channel throughput on the receivers not experiencing any demodulation problems. Therefore, it may be advantageous to allocate additional resources as dedicated channel estimation resources. Once the base station has allocated the additional resources, it returns to block 410.

FIG. 4B illustrates an embodiment of a method 402 of receiving symbols and channel and interference estimation in a system having dynamic allocation of resources for channel and interference estimation. The method 402 of FIG. 4B is an embodiment of a complement to the method 400 of FIG. 4A.

The method 402 can be implemented in the reverse link path of a base station or in the forward link path of a user terminal. The discussion of FIG. 4B describes an implementation in the forward link path of a user terminal to complement the description of FIG. 4A.

The method 402 begins at block 440 where the user terminal receives broadcast symbols. The user terminal proceeds to block 450 and determines the baseline channel estimation resources allocated within the system. The user terminal then proceeds to block 452 and determines if any additional resources have been allocated by the system for channel and interference estimation.

In the case where the additional resources are common resources added as a result of another receiver requesting resources, the user terminal can use the additional common resources in its channel and interference estimation. In the case where the additional resources are dedicated channel and interference estimation resources, the user terminal can use the dedicated resources only if the user has access to the dedicated resources. This restriction typically requires the user terminal to have previously requested the resources.

After determining the presence of any additional resources, the user terminal proceeds to block 460 and determines a channel and interference estimate based on the available resources. After determining the estimate, the user terminal proceeds to block 470 and attempts to demodulate the received symbols based in part on the estimate.

The user terminal then proceeds to decision block 472 and determines if the receiver in the user terminal successfully demodulated the received signals.

If the user terminal determines successful demodulation, the user terminal proceeds from decision block 472 back to block 440 to receive additional symbols. If, at decision block 472, the user terminal determines that the symbols were not successfully demodulated, the user terminal proceeds to block 480 and requests additional resources for channel and interference estimation.

The request can be explicit where the user terminal transmits a request for additional channel estimation resources. Alternatively, the request can be implicit, such a where the user terminal requests retransmission of unsuccessfully demodulated data. The user terminal need not even send a transmission for an implicit request. For example, the user terminal may omit sending an ACK if the demodulation is unsuccessful. The lack of an ACK may indicate a request for retransmission and may also indicate a request for additional channel and interference resources.

Once the user terminal has requested additional resources, whether explicit or implicit, the user terminal returns to block 440 to receive the transmitted symbols. In the case of a request for retransmission, the transmitted symbols can be a retransmission of the previously received symbols that were unsuccessfully demodulated.

Figure 5:
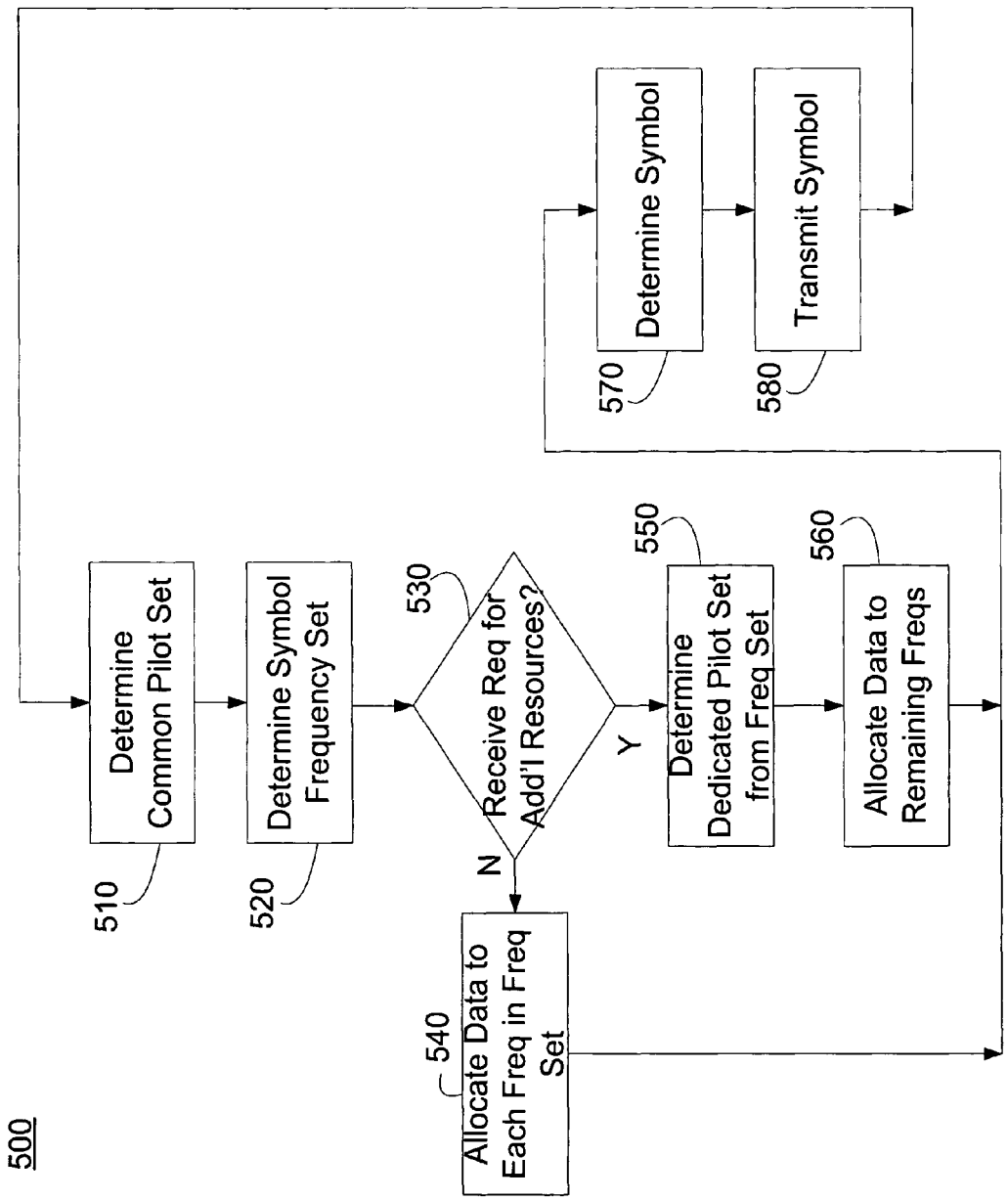
FIG. 5 illustrates a flowchart of an embodiment of a process of allocating channel estimation resources by pilot insertion.

FIG. 5 illustrates a flowchart of an embodiment of a method 500 of allocating channel estimation resources in an OFDMA wireless communication system by pilot insertion. The method 500 can be performed, for example, by the base station of FIG. 1 in the forward link path or by the user terminal of FIG. 1 in the reverse link path. The following discussion describes the method 500 as being performed by a base station.

The method 500 begins at block 510 where the base station initially determines a common pilot set, dedicated pilot set, or a combination of common pilot and dedicated pilot set allocated to channel and interference estimation. The common pilot can be, for example, a staggered pilot or a combination of staggered pilot and one or more individual pilots, and the base station can determine the carriers that are allocated to the channel and interference estimation before each OFDMA symbol or some other interval.

The base station then proceeds to block 520 where it determines the symbol frequency set. There may be multiple user terminals simultaneously supported by the base station, and each of the user terminal may be allocated a subset of the available carriers remaining after the allocation of the common pilot carriers. The base station can allocate a distinct number of carriers as data carriers dedicated to each of the active user terminals.

The base station then proceeds to decision block 530 and determines if the base station has received a request for additional resources for channel and interference estimation for any of the user terminals. If not, the base station proceeds from decision block 530 to block 540 where the base station allocates data to each of the carriers in the frequency set for each of the user terminals.

If, at decision block 530, the base station determines that one or more of the user terminals has requested additional channel and interference estimation resources, the base station proceeds from decision block 530 to block 550. In block 550, the base station determines which of the carriers in the set of carriers allocated to each of the user terminals is to be replaced with a dedicated pilot signal. The base station then proceeds to block 560 and allocates data to each of the carriers in the frequency set not allocated to the dedicated pilot signals. If one or more of the data carriers is allocated to a dedicated pilot, the base station can leave the carrier unmodulated, or may blank or otherwise null the dedicated pilot carrier.

The base station then proceeds to block 570 and determines the OFDMA symbol for the user terminals. The base station proceeds to block 580 and transmits the symbols, then returns to block 510 to prepare the next symbol.

Figure 6:
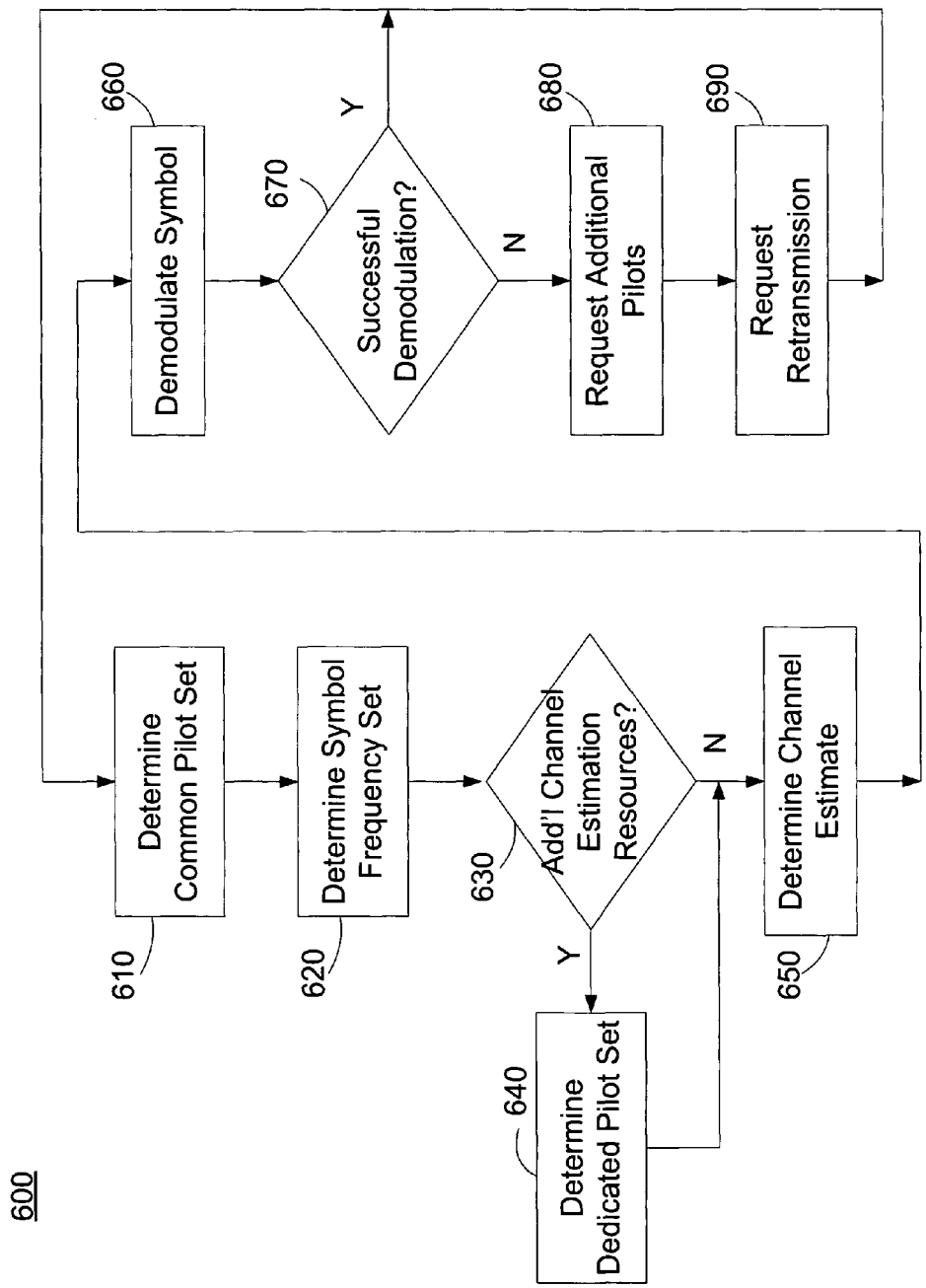
FIG. 6 illustrates a functional block diagram of an embodiment of a process of receiving data in a system having dynamic allocation of channel estimation resources.

FIG. 6 illustrates a flowchart of an embodiment of a method 600 of receiving data in an OFDMA system having dynamic allocation of channel estimation resources. The method 600 can be implemented, for example, in the forward link of a user terminal of FIG. 1, or can be implemented in a reverse link of a base station of FIG. 1. The following discussion describes the method 600 as implemented in the user terminal to complement the previous description of the base station in FIG. 5.

The method 600 begins at block 610 where the user terminal determines which of the carriers is allocated to the common pilot signal. After determining the common pilot set, the user terminal proceeds to block 620 and determines which of the remaining carriers is allocated to communicating with the user terminal.

After determining the symbol frequency set, the user terminal proceeds to decision block 630 and determines if additional channel and interference estimation resources are present in the symbol. The user terminal can determine the presence of the additional resources as a result of a prior request for additional resources, or may be aware of the presence of additional resources due to prior inability to demodulate the received data. For example, in a HARQ system, the base station may automatically retransmit data if the user terminal does not provide an ACK. Additionally, the retransmitted data may be a at a lower coding rate and may include dedicated channel and interference estimation resources according to a predetermined algorithm. For example. for each retransmission, the coding rate may drop by a predetermined factor and a dedicated pilot may be included in the retransmitted data.

If additional dedicated pilot resources are present, the user terminal proceeds from decision block 630 to block 640 and determines which of the carriers is allocated to the dedicated pilot. As noted earlier, the user terminal may determine which of the carriers is allocated to a dedicated pilot based on a predetermined algorithm. The user terminal then proceeds to block 650.

If, at decision block 630, the user terminal determines that no additional dedicated pilot signals are present, the user terminal proceeds to block 650. At block 650, the user terminal determines a channel estimate based on the allocated resources. The user terminal can determine a channel and interference estimate solely on the basis of the common pilot signal. However, if dedicated pilot signals are available, the user terminal can determine a channel and interference estimate based on the combination of the dedicated pilot signals and the common pilot signals.

After determining the channel and interference estimate, the user terminal proceeds to block 660 and attempts to demodulate the signal using the previously determined estimate. The user terminal proceeds to decision block 670 and determines if the received signal was successfully demodulated.

If the received data is successfully demodulated, the user terminal proceeds back to block 610 to prepare for the next symbol. Alternatively, if the user terminal, at decision block 670 determines that the received data was not successfully demodulated, the user terminal proceeds to block 680 and requests additional dedicated pilot signals to further improve the channel and interference estimate of subsequent received data.

Optionally, the user terminal can proceed to block 690 and request retransmission. In some embodiments, no retransmission is requested. Instead, the unsuccessfully demodulated data is dropped. As previously noted, in a system implementing HARQ, retransmission may occur if the user terminal fails to send an ACK. In some embodiments, the retransmission request and the request for additional pilot signals is the same message, or omission. Following the retransmission request, the user terminal proceeds back to block 610 to prepare for the next symbol.

A system, apparatus, and method have been disclosed for dynamic resource allocation for channel and interference estimation. In an OFDMA system, the dynamic resource allocation can be implemented as incremental pilot insertion. The incremental pilot insertion can be implemented as dedicated pilot signals such that the performance of the other users is not degraded by the addition of the resources.

The extra resources allocated to channel and interference estimation may only result in a small performance loss for the apparatus having the additional resources, especially if the dedicated resources are added in the form of code puncturing of retransmissions that are provided at a reduced data or code rate. The performance gains attributable to increased estimation resources can be significant and can more than justify the increased estimation resources.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus for dynamic allocation of resources for channel estimation, the apparatus comprising:
    a channel quality module configured to determine a request for channel estimation resources in place of at least one data symbol;
    a resource allocation module in communication with a receiver and configured to determine a baseline resource level comprising a common pilot signal and a variable resource level, the variable resource level based at least in part on the request for channel estimation resources, wherein the variable resource level comprises at least one dedicated pilot signal which is code punctured onto a data symbol, and wherein the position and the number of the at least one dedicated pilot signal is communicated on a control or overhead channel;
    a receiver module configured to receive a request for variable channel resources after determining that one or more data symbols were unsuccessfully demodulated; and a transmitter configured to retransmit the one or more data symbols at a data rate lower than a previously used data rate.

2. The apparatus of claim 1, wherein the transmitter is coupled to the resource allocation module and is further configured to transmit a signal having a portion allocated to channel estimation based on the baseline resource level and the variable resource level.

3. The apparatus of claim 1, wherein the request for channel estimation resources comprises a request for retransmission.

4. The apparatus of claim 1, wherein the channel quality module determines the request for channel estimation in part based on a presence or absence of an acknowledge message.

5. The apparatus of claim 1, wherein the variable resource level comprises an additional pilot signal.

6. An apparatus for dynamic allocation of resources for channel estimation, the apparatus comprising:
- a common pilot module, operative to aid channel estimation in one or more receivers, configured to determine a first subset of carriers from a set of Orthogonal Frequency Division Multiple Access (OFDMA) carriers, the first subset of carriers allocated to a common pilot signal;
- a symbol module configured to determine a second subset of OFDMA carriers allocated to a communication link, the second subset of OFDMA carriers distinct from the first subset of OFDMA carriers;
- a dedicated pilot module configured to code puncture at least one dedicated pilot signal onto a data symbol, and wherein the position and the number of the at least one dedicated pilot signal is communicated on a control or overhead channel;
- a symbol generator configured to generate an OFDMA symbol from the OFDMA carriers; and
- a transmitter configured to transmit the OFDMA symbol having the at least one dedicated pilot signal allocated to channel estimation, and to retransmit the OFDMA symbol at a data rate lower than a previously used data rate after determining that the OFDMA symbol was unsuccessfully demodulated.

7. The apparatus of claim 6, wherein the dedicated pilot module is further configured to null the at least one carrier from the second subset of OFDMA carriers.

8. The apparatus of claim 6, wherein the symbol generator comprises an Inverse Fast Fourier Transform (IFFT) module.

9. An apparatus for channel estimation using a mobile station based on dynamic allocation of resources, the apparatus comprising:
- a receiver configured to receive an Orthogonal Frequency Division Multiple Access (OFDMA) symbol having resources allocated to channel estimation;
- a transform module coupled to the receiver and configured to transform the OFDMA symbol to a plurality of data carriers;
- a carrier allocation module configured to determine a first subset of carriers corresponding to a common pilot signal, a second subset of carriers corresponding to data carriers, and at least one carrier from the second subset of carriers corresponding to at least one dedicated pilot signal, wherein the at least one dedicated pilot signal is code punctured onto one of the data carriers, and wherein the position and the number of the at least one dedicated pilot signal is communicated on a control or overhead channel;
- a channel estimator coupled to the transform module and the carrier allocation module, and configured to determine a channel estimate based in part on the common pilot signal and the at least one dedicated pilot signal;
- a demodulator configured to demodulate the data carriers based in part on the channel estimate; and
- a transmitter transmitting a request for at least one carrier from the second subset of carriers after determining that the data carriers were unsuccessfully demodulated using the common pilot signal, wherein the receiver is further configured to re-receive the OFDMA symbol at a data rate lower than a previously used data rate.

10. The apparatus of claim 9, wherein the transform module comprises a Fast Fourier Transform (FFT) module.

11. The apparatus of claim 9, wherein the at least one dedicated pilot signal comprises a null pilot.

12. The apparatus of claim 9, wherein the at least one dedicated pilot signal comprises a carrier modulated with at least one predetermined symbol.

13. The apparatus of claim 9, wherein the channel estimator is further configured to determine an interference estimate based in part on the common pilot signal and the at least one dedicated pilot signal.

14. A method of generating a signal in a wireless communication device having dynamically allocated channel estimation resources, the method comprising:
- assigning a baseline level of resources to channel estimation, wherein the baseline level of resources comprises a common pilot symbol;
- determining a request for additional resources by a receiver after determining that one or more data symbols were unsuccessfully demodulated at the receiver using the baseline level of resources;
- allocating additional resources for channel estimation in place of at least one data symbol by puncturing at least one dedicated pilot symbol onto the one or more data symbols, wherein the position and the number of the at least one dedicated pilot signal is communicated on a control or overhead channel;
- generating a signal based in part on the baseline level of resources and the additional resources; and
- retransmitting the signal comprising the one or more data symbols at a data rate lower than a previously used data rate.

15. The method of claim 14, wherein assigning the baseline level of resources comprises allocating a predetermined number of carriers from a set of Orthogonal Frequency Division Multiple Access (OFDMA) carriers to a common pilot signal.

16. The method of claim 15, wherein allocating the predetermined number of carriers comprises allocating a predetermined number of carriers based on a predetermined algorithm.

17. The method of claim 14, wherein determining the request for additional resources comprises receiving a request for retransmission.

18. The method of claim 14, wherein determining the request for additional resources comprises determining an unsuccessful transmission.

19. The method of claim 14, wherein determining the request for additional resources comprises determining that an acknowledge message was not received within a predetermined period of time.

20. The method of claim 14, wherein allocating additional resources to channel estimation comprises:
- determining a predetermined number of carriers from a set of Orthogonal Frequency Division Multiple Access (OFDMA) carriers corresponding to data carriers.

21. The method of claim 20, wherein the at least one dedicated pilot signal comprises a carrier modulated with at least one predetermined symbol.

22. The method of claim 20, wherein the at least one dedicated pilot signal comprises a null pilot.

23. The method of claim 14, wherein generating the signal comprises generating an Orthogonal Frequency Division Multiple Access (OFDMA) symbol having a first subset of carriers providing the baseline level of resources and a second subset of carriers providing the additional resources.

24. A method of processing a signal in a wireless communication device having dynamically allocated channel estimation resources, the method comprising:
processing an Orthogonal Frequency Division Multiple Access (OFDMA) symbol;
determining a baseline level of channel estimation resources included in the OFDMA symbol, wherein the baseline level comprises a common pilot signal;
determining additional channel estimation resources included in the OFDMA symbol by puncturing at least one dedicated pilot signal onto the OFDMA symbol, wherein the position and the number of the at least one dedicated pilot signal is communicated on a control or overhead channel;
determining a channel estimate based on the baseline level and additional channel estimation resources;
demodulating the OFDMA symbol based in part on the channel estimate;
requesting additional channel estimation resources for allocation to the OFDMA symbol after determining that the OFDMA symbol was unsuccessfully demodulated using the baseline level of channel estimation resources; and
re-receiving the OFDMA symbol at a data rate lower than a previously used data rate.

25. The method of claim 24, wherein determining the baseline level of channel estimation resources comprises determining carriers corresponding to the common pilot signal.

26. The method of claim 24, wherein determining the additional channel estimation resources comprises determining at least one carrier corresponding to a null pilot signal.

27. The method of claim 24, further comprising:
determining whether the OFDMA symbol was successfully demodulated; and
requesting additional channel resources if the OFDMA symbol was not successfully demodulated.

28. The method of claim 27, wherein requesting additional resources comprises transmitting a request for retransmission.

29. The method of claim 27, wherein requesting additional resources comprises failing to transmit an acknowledgement message.

30. A method of generating a signal in a wireless communication device having dynamically allocated channel estimation resources, the method comprising:
determining a common pilot set from a set of Orthogonal Frequency Division Multiple Access (OFDMA) carriers;
determining a symbol set from the set of OFDMA carriers;
determining a request for additional channel estimation resources by a receiver after determining that the symbol set was unsuccessfully demodulated at the receiver using the common pilot;
assigning at least one carrier from the symbol set as at least one dedicated pilot signal by puncturing the at least one dedicated pilot signal onto the symbol, wherein the position and the number of the at least one dedicated pilot signal is communicated on a control or overhead channel;
modulating carriers of the symbol set with data except for the at least one carrier assigned as the at least one dedicated pilot signal;
generating an OFDMA symbol from the set of OFDMA carriers; and
retransmitting the OFDMA symbol at a data rate lower than a previously used data rate.

31. A method of generating a signal in a wireless communication device having dynamically allocated channel estimation resources, the method comprising:
assigning a baseline level of resources for channel estimation, wherein the baseline level of resources comprises a common pilot signal;
determining a receiver signal quality metric greater than a predetermined threshold;
determining resources to be omitted from the baseline level of resources;
generating a signal based in part on the baseline level of resources having data symbols allocated to the resources omitted from the baseline level of resources after determining by a receiver that one or more data symbols were unsuccessfully demodulated at the receiver using the baseline level of resources, wherein at least one dedicated pilot signal is punctured onto the one or more data symbols, and wherein the position and the number of the at least one dedicated pilot signal is communicated on a control or overhead channel; and
retransmitting the one or more data symbols at a data rate lower than a previously used data rate.

32. An apparatus configured to generate a signal having dynamically allocated channel estimation resources, the apparatus comprising:
means for assigning a baseline level of resources to channel estimation, wherein the baseline level of resources comprises a common pilot signal;
means for determining a request for additional resources by a receiver after determining that one or more data symbols were unsuccessfully demodulated at the receiver using the baseline level of resources;
means for allocating additional resources for channel estimation in place of one or more data symbol by puncturing at least one dedicated pilot signal onto the at least one data symbol, wherein the position and the number of the at least one dedicated pilot signal is communicated on a control or overhead channel;
means for generating a signal based in part on the baseline level of resources and the additional resources; and
means for retransmitting the one or more data symbols at a data rate lower than a previously used data rate.

33. The apparatus of claim 32, wherein the means for assigning the baseline level of resources comprises means for allocating a predetermined number of carriers from a set of Orthogonal Frequency Division Multiple Access (OFDMA) carriers to a pilot signal.

34. The apparatus of claim 32, wherein the means for determining the request for additional resources comprises means for processing a request for retransmission.

35. The apparatus of claim 32, wherein the means for allocating additional resources to channel estimation comprises:
means for determining a predetermined number of carriers from a set of Orthogonal Frequency Division Multiple Access (OFDMA) carriers corresponding to data carriers.

36. An apparatus configured to generate a signal having dynamically allocated channel estimation resources, the apparatus comprising:
- means for assigning a baseline level of resources for channel estimation, wherein the baseline level of resources comprises a common pilot signal;
- means for determining a receiver signal quality metric greater than a predetermined threshold;
- means for determining resources to be omitted from the baseline level of resources by puncturing at least one dedicated pilot symbol onto one of a plurality of data symbols, wherein the position and the number of the at least one dedicated pilot signal is communicated on a control or overhead channel;
- means for generating a signal based in part on a baseline level of resources after determining by a receiver that one or more data symbols were unsuccessfully demodulated at the receiver using the baseline level of resources; and
- means for retransmitting the one or more data symbols at a data rate lower than a previously used data rate.

37. The apparatus of claim 36, wherein a carrier from an Orthogonal Frequency Division Multiple Access (OFDMA) system is assigned to the common pilot signal.

38. An apparatus for dynamic allocation of resources for channel estimation, the apparatus comprising:
- a memory;
- a processor configured to determine a baseline resource level comprising a common pilot signal and a variable resource level, the variable resource level based at least in part on a request for channel estimation resources, wherein the variable resource level comprises at least one dedicated pilot signal which is code punctured onto a data symbol, and wherein the position and the number of the at least one dedicated pilot signal is communicated on a control or overhead channel;
- a receiver configured to receive a request for variable channel resources in place of at least one data symbol after determining that one or more data symbols were unsuccessfully demodulated; and
- a transmitter configured to retransmit the one or more data symbols at a data rate lower than a previously used data rate.

39. The apparatus of claim 38, wherein the processor is configured to determine the request for channel estimation resources in part based on a presence or absence of an acknowledge message.

40. The apparatus of claim 38, wherein the variable resource level comprises an additional pilot signal.

41. A computer-readable medium storing instructions thereon, which when executed by a processor, performs a method of dynamic allocation of resources for channel estimation, comprising:
- determining a baseline resource level comprising a common pilot signal and a variable resource level, the variable resource level based at least in part on a request for channel estimation resources, wherein the variable resource level comprises at least one dedicated pilot signal which is code punctured onto a data symbol, and wherein the position and the number of the at least one dedicated pilot signal is communicated on a control or overhead channel;
- receiving a request for variable channel resources in place of at least one data symbol after determining that one or more data symbols were unsuccessfully demodulated; and
- retransmitting the one or more data symbols at a data rate lower than a previously used data rate.

42. The computer-readable medium of claim 41, wherein the request for channel estimation resources is determined in part based on a presence or absence of an acknowledge message.

43. The computer-readable medium of claim 41, wherein the variable resource level comprises an additional pilot signal.

44. A processor configured to execute instructions for performing a method of dynamic allocation of resources for channel estimation, the method comprising:
- instructions to determine a baseline resource level comprising a common pilot signal and a variable resource level, the variable resource level based at least in part on a request for channel estimation resources, wherein the variable resource level comprises at least one dedicated pilot signal which is code punctured onto a data symbol, and wherein the position and the number of the at least one dedicated pilot signal is communicated on a control or overhead channel;
- instructions to receive a request for variable channel resources in place of one or more data symbol after determining that the one or more data symbols were unsuccessfully demodulated; and
- instructions to retransmit the one or more data symbols at a data rate lower than a previously used data rate.

45. The processor of claim 44, wherein the method further comprises determining the request for channel estimation resources in part based on a presence or absence of an acknowledge message.

46. The processor of claim 44, wherein the variable resource level comprises an additional pilot signal.

* * * * *